United States Patent [19]

Marshall et al.

[11] Patent Number: 4,879,537
[45] Date of Patent: Nov. 7, 1989

[54] MAGNETIC SUSPENSION AND MAGNETIC FIELD CONCENTRATION USING SUPERCONDUCTORS

[75] Inventors: David B. Marshall; Roger E. De Wames; Peter E. D. Morgan; Joseph J. Ratto, all of Thousand Oaks, Calif.

[73] Assignee: Rockwell International Corporation, El Segundo, Calif.

[21] Appl. No.: 223,591

[22] Filed: Jul. 25, 1988

[51] Int. Cl.$^4$ ................................. H01F 7/22
[52] U.S. Cl. ..................... 335/216; 310/90.5; 505/1
[58] Field of Search ............ 335/216; 310/90.5; 505/1

[56] References Cited

U.S. PATENT DOCUMENTS 4,797,386 1/1989 Gyorgy ............................ 335/216

OTHER PUBLICATIONS

V. Arkaiev, Nature 160, 330 (1947).
R. Williams, et al, Appl. Phys. Lett. 52, 751 (1988).
F. C. Moon, et al, Appl. Phys. Lett. 52, 1534 (1988).
F. Hellman, et al, Appl. Phys. 63, 447 (1988).
P. N. Peters, et al, Appl. Phys. Lett. 52, 2066 (1988).
R. J. Cava, et al, Phys. Rev. Lett. 58, 1676 (1987).

*Primary Examiner*—George Harris
*Attorney, Agent, or Firm*—H. Fredrick Hamann; Craig O. Malin

[57] ABSTRACT

A device is provided for suspending an external load by means of a magnetic field and a superconductor. The superconductor is supported in a magnetic field which penetrates the superconductor. A magnet is suspended below the superconductor and oriented so that its magnetic moment is aligned parallel to the magnetic field. The magnet is provided with a coupling means so that it can be coupled to an external load. Either a vertical or a horizontal magnetic field can be used. In one embodiment, the load-carrying member is a composite material suspended from a supported magnet. The composite consists of a superconducting phase and an attractive phase comprising either a magnet, a ferromagnetic material, or a paramagnetic material. In another embodiment, a device for concentrating flux is provided by placing a superconductor between the source of the magnetic field and the position in which the concentrated flux is desired.

13 Claims, 7 Drawing Sheets

MAGNETIC SUSPENSION AND MAGNETIC FIELD CONCENTRATION USING SUPERCONDUCTORS

BACKGROUND OF THE INVENTION

This invention is concerned with suspending loads and with concentrating magnetic flux using superconductors.

Levitation of a magnet above a superconducting disc is one of the most widely used demonstrations of superconductivity, particularly in high temperature superconductors such as $YBa_2Cu_3O_x$. See for example V. Arkadiev, NATURE, 160, 330 (1947); and R. Williams and J. R. Matey, APPL. PHYS. LETT. 52, 751 (1988). A characteristic of this experiment is that the magnet can be made to float over a range of distances from the superconductor, simply by gently pushing the magnet up or down. This is the result of hysteresis in the magnetic susceptibility of the superconductor, associated with flux penetration and pinning over the range of magnetic fields for which type II behavior is exhibited. The hysteresis also contributes to stability of the floating magnet against horizontal displacements, because it gives rise to an effective frictional force.

According to Moon, et al, APPL. PHYS. LETT. 52, 1534 (1988), the hysteresis arises from flux penetration and pinning in regions of the superconductor where the magnetic field exceeds the lower critical field, $H_{cl}$. Flux penetration and pinning in superconducting $YBa_2Cu_3O_x$ has been demonstrated by measuring trapped magnetic fields in the superconductor after a magnet had been brought into close proximity and then removed according to F. Hellman, et al, J. APPL. PHYS. 63, 447 (1988).

Suspension of a $YBa_2Cu_3O_x$ superconductor containing silver oxide to increase the strength of flux pinning has been observed as reported recently by P. N. Peters, et al, in APPL. PHYS. LETT. 52, 2066 (1988).

SUMMARY OF THE INVENTION

It is an object of the invention to provide a device for suspending a load by the use of a magnetic field and superconductive material.

It is an object of the invention to provide a device to increase the intensity of a magnetic field using a superconductive material.

According to the invention, a magnet is suspended below a supported superconductor. A magnetic field is provided above the superconductor and penetrates the superconductor. This allows stable magnetic suspension of the magnet. The magnet has a means for coupling to a load so that it can carry or otherwise respond to an externally applied load.

In a preferred embodiment, a magnet is provided above the superconductor to provide the penetrating magnetic field. This field magnet can itself be levitated above the superconductor, or it can be supported on the upper surface of the superconductor.

In one embodiment, the magnetic field is substantially vertical and the magnetic moment of the suspended magnet is aligned parallel to and in the same direction as the magnetic field. In another embodiment, the magnetic field is horizontal and the magnetic moment of the suspended magnet is aligned parallel to and in the same direction as the horizontal magnetic field.

In another embodiment, a composite material is suspended below an externally supported magnet. The composite material comprises a combination of a superconductor and either a ferromagnetic material, a paramagnetic material, or a magnet. A means is provided for coupling a load to the composite material.

In another embodiment, the intensity of a magnetic field is increased by positioning a type II superconductor between the source of the magnetic field and the location where the more intense magnetic field is desired.

These and other objects and features of the invention will be apparent from the following detailed description taken with reference to the accompanying drawings.

DESCRIPTION OF THE INVENTION

A superconducting disc of $YBa_2Cu_3O_x$ (40 mm diameter, 8 mm thickness) was sintered from powder derived from $Cu(NO3)2$, $Y_2O_3$ and $Ba(OH)_2$. After being dried, milled, and calcined, the powder was iso-pressed, sintered in $O_2$ at 950 C for 10 h, 970 C for 18 h and finally annealed at 500 C for 24 h.

Figure 1:
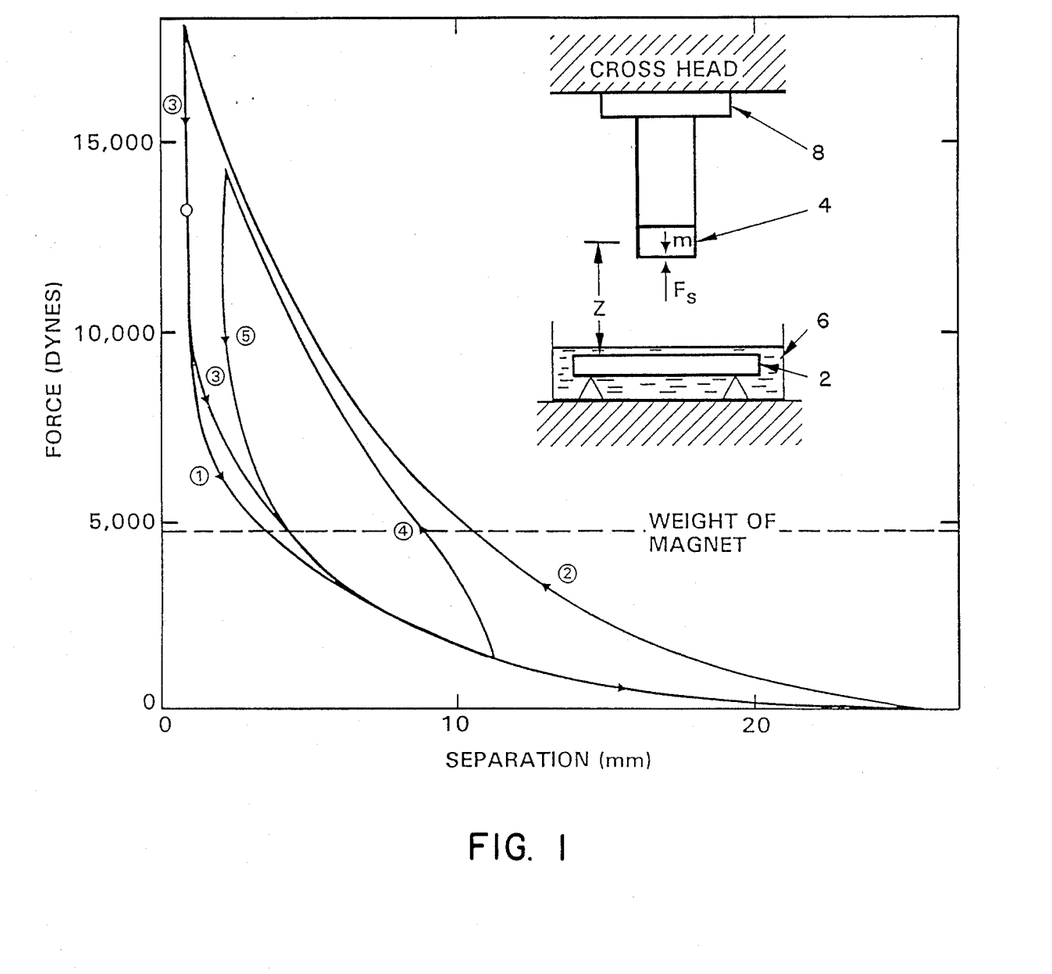
FIG. 1 the test results and the experimental arrangement used to measure flux penetration and pinning by means of measuring forces between a magnet and a superconductor.

Some effects of flux penetration were investigated by measuring forces between superconducting disc 2 and a Neodymium-Iron-Boron magnet 4 (disc shaped, 5 mm thickness, 13 mm diameter) using the experimental arrangement shown in FIG. 1. The superconductor was immersed in liquid $N_2$ 6 and the magnet was attached to a load cell 8 on the movable crosshead of a commercial mechanical testing machine. The sensitivity of the load measurements was about 20 dyne. All measurements were made with the dipole of the magnet normal to the surface of the superconductor and the disks coaxial. The force was measured as a function of separation, for several load-unload cycles, as indicated by the curves in FIG. 1. The results are similar to those reported recently by Moon, et al, (id.) for a magnet oriented with its dipole parallel to the surface of the superconductor. There is a large hysteresis in the force-displacement relation, with a distinct change in slope at reversal points. This slope is a measure of the magnetic stiffness.

Figure 2:
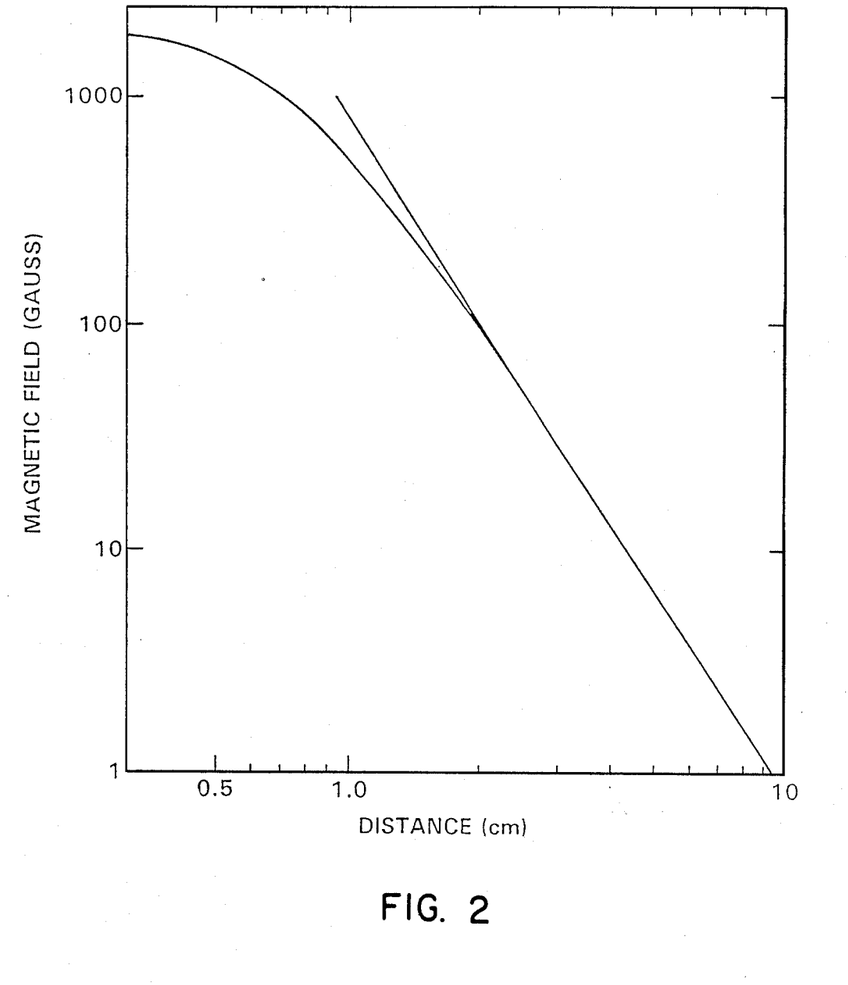
FIG. 2 a plot of Hall probe measurements of the field along the axis of the magnet.

The critical field for ceramic $YBa_2Cu_3O_x$ has been reported to be about 100 G. From Hall probe measurements of the field along the axis of the magnet (FIG. 2), it is evident that over most of the range of separations in FIG. 1 the field at the upper surface of the superconductor directly beneath the magnet exceeds this value.

The weight of the magnet is indicated in FIG. 1 by the horizontal broken line. The intersections of this line with the two branches of the hysteresis loop at separations of 4 and 10 mm define the height range over which the magnet can be made to levitate above the superconducting disc. These values agreed with observations using the same magnet floating freely.

Figure 3:
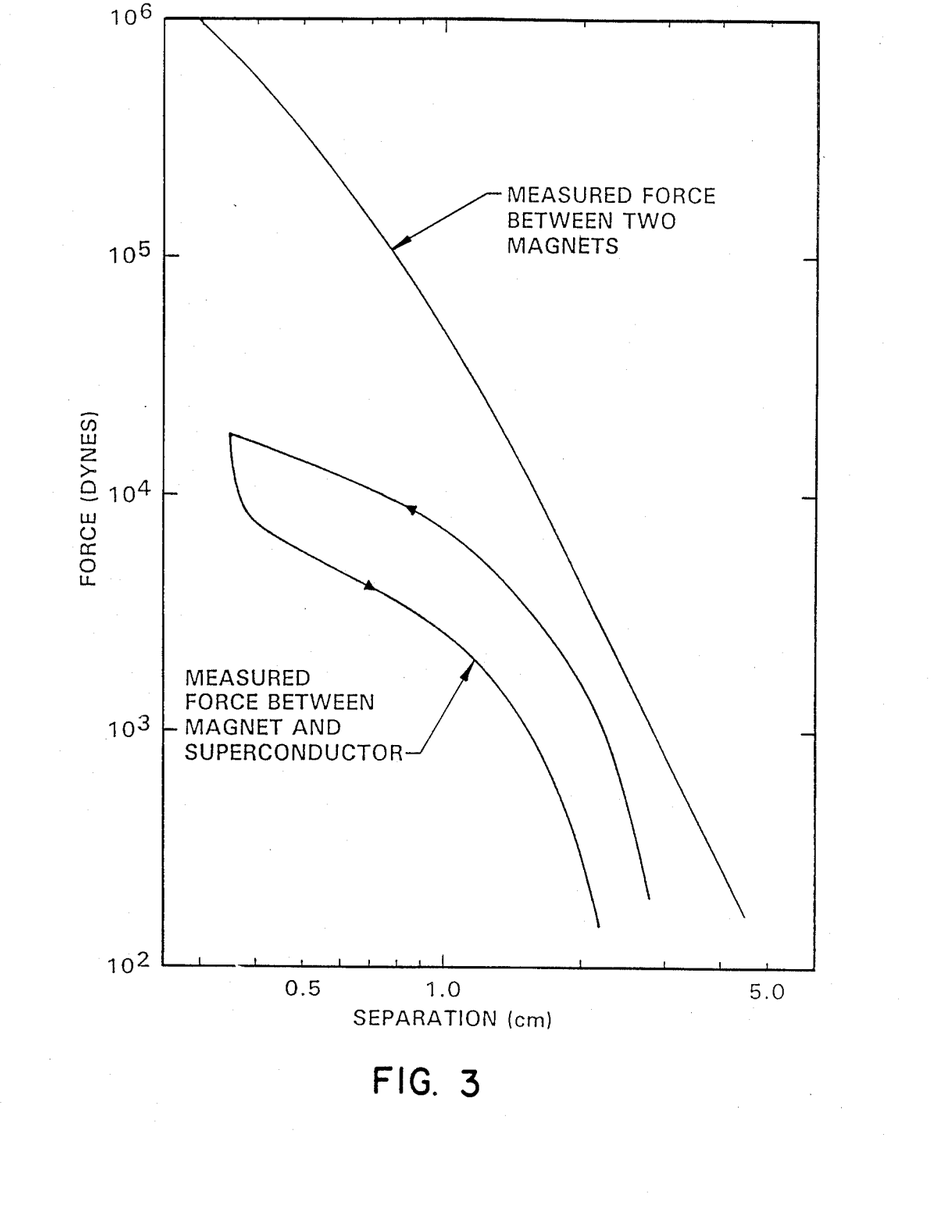
FIG. 3 a comparison of the measured repulsive forces between the superconductor and the magnet with the force expected from an ideal type I superconductor.

The measured repulsive forces between the superconductor and the magnet (from FIG. 1) are compared with the force expected from an ideal type I superconductor (i.e., complete Meissner effect) in FIG. 3. For complete flux expulsion, the force on the magnet is equivalent to that obtained by replacing the superconductor with an identical image magnet located an equal distance behind the front surface of the superconductor. Direct measurements of this force were obtained, as in FIG. 1, by replacing the superconductor with a second, similar magnet. The results are plotted in FIG. 3 (upper curve), with the separation scale halved to represent the distance between the magnet and a superconductor. The actual force between the superconductor and the magnet is much smaller than expected for complete flux expulsion.

Levitation forces for a type II superconductor have been calculated by Hellman, et al, (id.) from a model based on the energy cost of flux penetration in vortices. The levitation height for this model is dependent upon the thickness of the superconductor but independent of the size of the magnet. Results in support of these predictions were presented. However, we have observed that the levitation height is not independent of the magnet size; using pieces cut from the one magnet, the maximum height was found to increase from 0.5 cm for a piece with dimensions 0.2×0.2×0.2 cm to 1.1 cm for a piece with dimensions 0.6×0.6×0.8 cm. Such an increase is expected for repulsive forces due to flux expulsion (in that case the levitation height would be proportional to the magnet volume to the one fourth power). It is clear that existing simple models do not account for several factors associated with nonuniformity of the microstructure of the $YBa_2Cu_3O_x$: the existence of regions that are not superconducting and the existence of a range of values of $H_{cl}$ within the microstructure, resulting in both type I and type II behavior.

Figure 4:
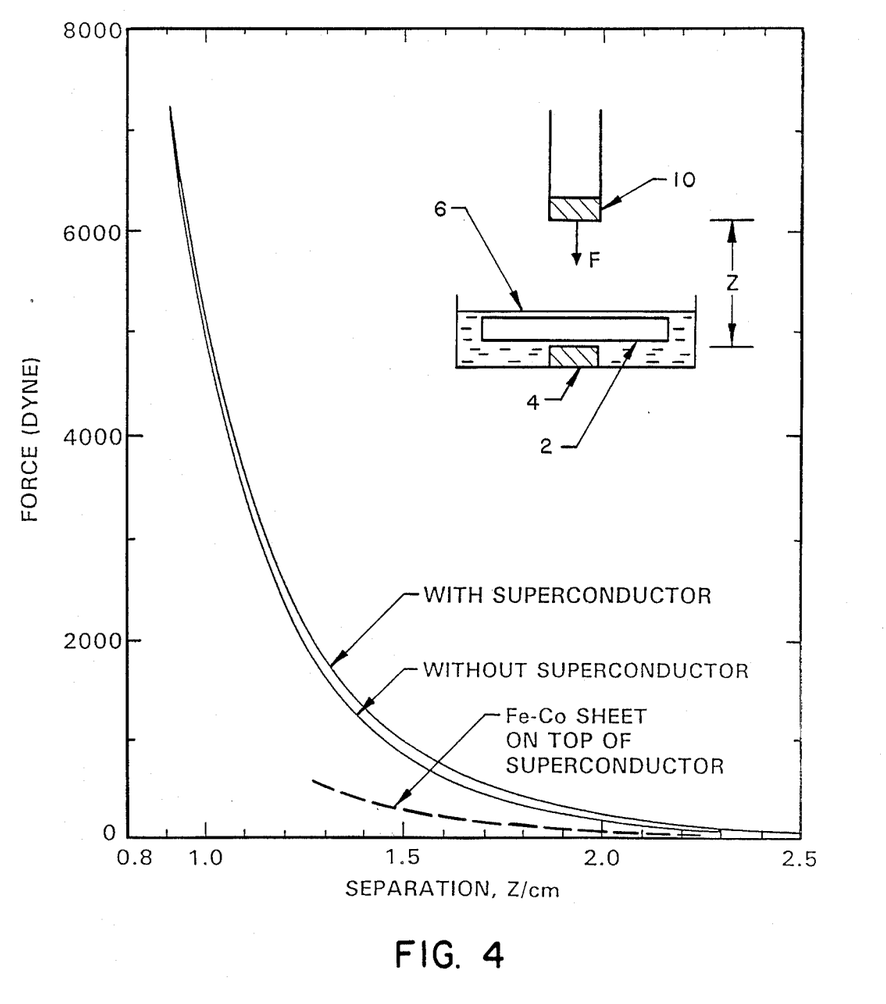
FIG. 4 the test results and the experimental arrangement used to measure flux penetration more directly than in FIG. 1.
Figure 5:
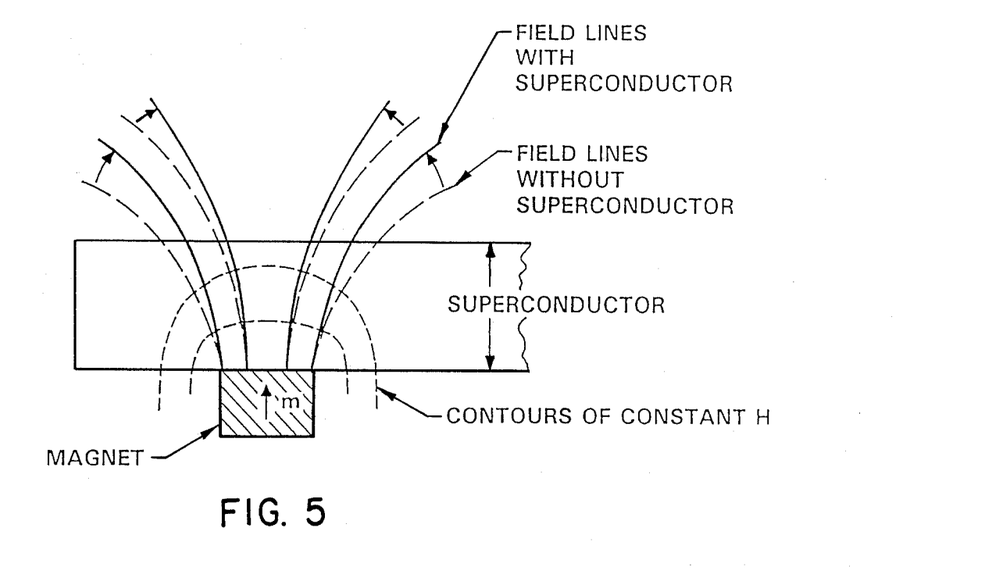
FIG. 5 illustrates the focusing effect of the superconductor on the magnetic field.

To evaluate flux penetration more directly, the attractive force between a piece of iron 10 and the magnet 4 were measured as illustrated in FIG. 4, both with and without the superconducting disc 2 between them. Any shielding of the magnetic field by the superconductor in these experiments should result in a reduction of the attractive force F on the iron. Moreover, in the event of field penetration through the superconductor, interaction of the induced magnetic moment of the iron with the superconductor would result in repulsive force and thus further reduce the attractive force. However, contrary to these expectations for shielding, the force between the magnet and iron was found to increase at a fixed distance when the superconductor was inserted. This result was obtained both with the $YBa_2Cu_3O_x$ disc in the superconducting state before being placed on top of the magnet and with the $YBa_2Cu_3O_x$ disc being cooled from room temperature after being placed on the magnet. Raising the superconducting disc 0.3 cm from the surface of the lower magnet did not alter the trend; nor did replacing the iron by a second magnet. However, when the superconductor was replaced by a thin sheet of an Fe-Co alloy that is commonly used for shielding (low coercive force, high permeability) a reduction in the attractive force between the magnet and iron was observed. The results of FIG. 4 indicate that the magnetic field along the axis of the magnet is increased by the presence of the superconductor through a focusing effect on the magnetic field, as illustrated in FIG. 5. This effect can be used wherever it is desirable to modify the distribution of a magnetic field, for example as a magnetic lens to help achieve high magnetic field.

Figure 6:
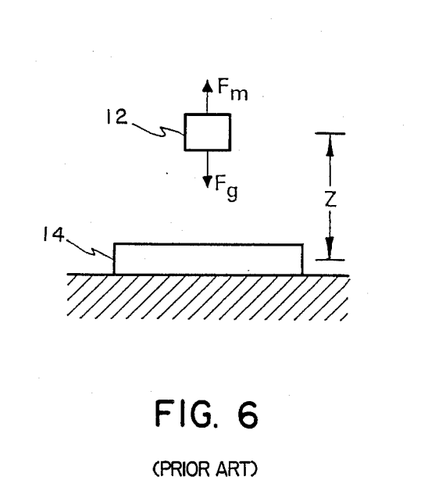
FIG. 6 shows the configuration of prior art levitation.
Figure 7:
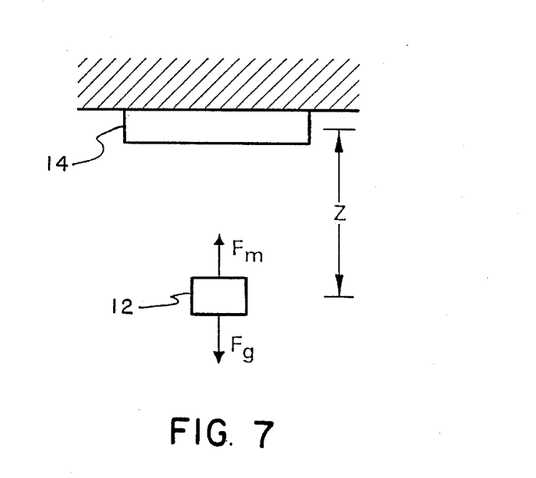
FIG. 7 shows the configuration used to evaluate suspension.

The hysteretic force characteristics and flux penetration described above make it possible to achieve stable magnetic suspension using several combinations of magnetic materials and superconductors. For a body subjected to a constant gravitational force, $F_g$, and a magnetic force, $F_m$, between it and another fixed body, the conditions for stable equilibrium are $$F_g + F_m = 0 \text{ and } dF_m/dz \geq 0,$$

with attractive forces defined as positive. For the configuration of FIG. 6 (levitation of the free body 12 above the fixed one 14) $F_g$ is positive and $F_m$ is negative. Therefore, if $F_m$ is a decreasing function of z, the stability condition, $dF_m/dz \geq 0$, is always satisfied. This is the case for a magnet and a superconductor, or for two magnets oriented to repel each other. For the configuration of FIG. 7 (suspension) $F_g$ is negative and $F_m$ is positive. In this case, stability requires that $F_m$ be an increasing function of z. This condition is not satisfied by two magnets oriented to attract each other. However, it is satisfied if $F_m$ is the sum of an attractive and a repulsive force and if the magnitude of the slope of the repulsive force function on a log-log plot is larger than that of the attractive force. This criterion is readily derived by writing the attractive and repulsive force functions as $Az^{-n}$ and $Bz^{-n}$, respectively, for values of z close to the equilibrium position. Then substitution in the equilibrium equations with the condition $F_g$ less than 0, gives the result m greater than n.

Figure 8:
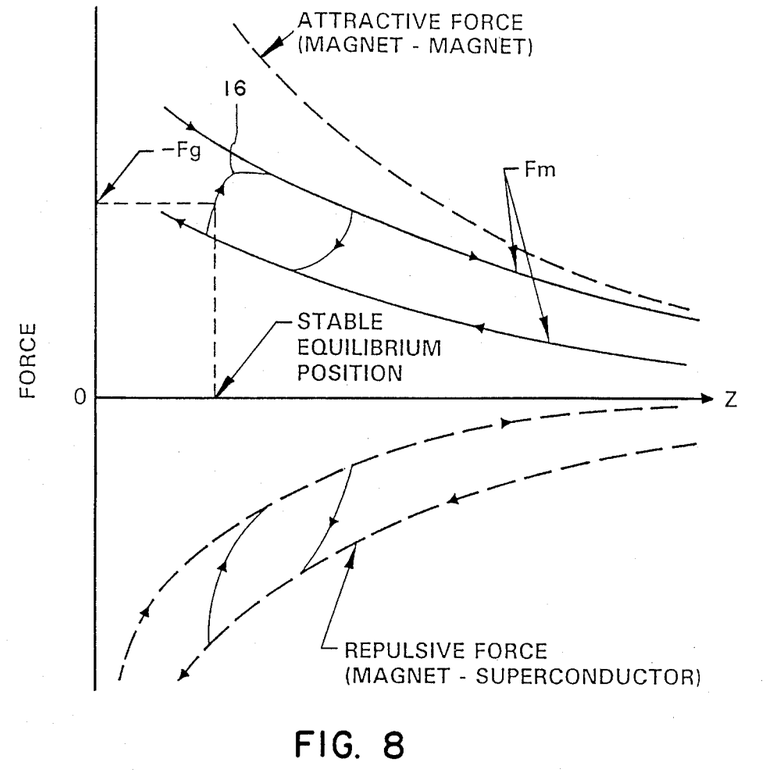
FIG. 8 illustrates the attractive and repulsive force functions.

Superimposed attractive and repulsive forces with different spatial variations can be obtained if the fixed body 14 in FIG. 7 is a magnet and the body 12 to be suspended is composed of two separate phases, one superconducting and other ferromagnetic, paramagnetic, or a permanent magnet. For a combination of a superconductor and a permanent magnet, the results of FIG. 3 indicate that the stability condition m greater than n is not satisfied for the force functions that define the outer hysteresis loop. The same conclusion holds if the magnet is replaced by a paramagnetic or ferromagnetic material, since the slope of the force-displacement relation for two magnets is smaller than that for a magnet and a paramagnetic or ferromagnetic material. However, force paths within the outer hysteresis loop of FIG. 1 have much higher slope and enable the condition m greater than n to be satisfied. The force functions in this case are illustrated schematically in FIG. 8, showing the higher slope of the force paths 16 within the outer hysteresis loop. Suspension of such a two-phase body was simulated by making a composite comprising a layer of the Fe-Co shielding alloy used in FIG. 4 sandwiched between two pieces of superconductor, each with dimensions of about 3×3×1 mm. This composite body was in stable equilibrium at about 0.8 cm below the magnet that was used for the data of FIG. 1.

Figure 9:
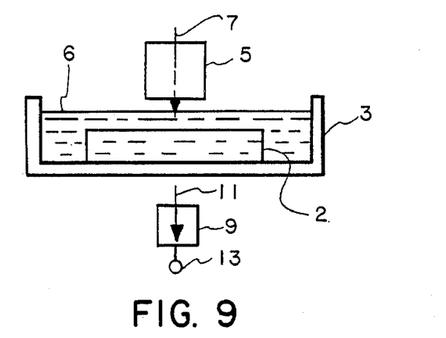
FIGS. 9 through 14 illustrate various embodiments of the suspension arrangement in accordance with the invention.

Combinations of magnets and superconductors that can give stable suspension are illustrated in FIGS. 9–14. In FIG. 9, superconductor 2 is supported in container 3 which is filled with liquid nitrogen 6 to cool the superconductor down to a superconducting temperature. A field magnet 5 placed above the superconductor provides a vertical magnetic field 7 which is oriented downward. A second magnet 9 is oriented so that it has a magnetic moment 11 that is oriented parallel to and in the same direction as magnetic field 7. Second magnet 9 is suspended below the superconductor, and is provided with a coupling means 13 so that it can be connected to a load.

Figure 10:
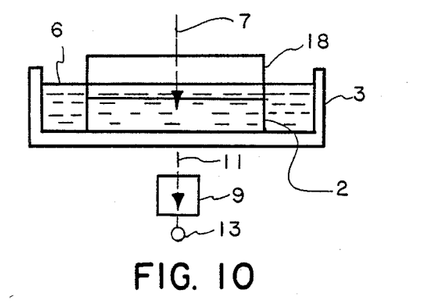

FIG. 10 shows an arrangement similar to FIG. 9 except that field magnet 18 is joined to superconductor 2 rather than being suspended above it as shown for magnet 5 in FIG. 9. In both the FIG. 9 and 10 embodiments, the magnetic moments could be oriented in the upward direction rather than in the downward direction as shown.

Figure 11:
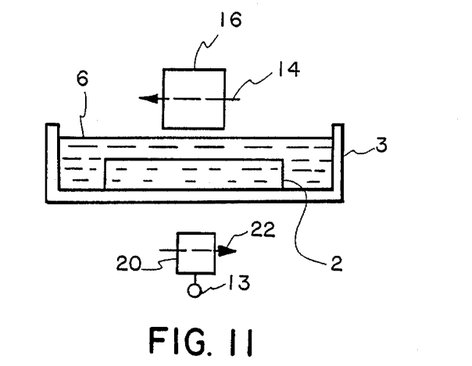
Figure 12:
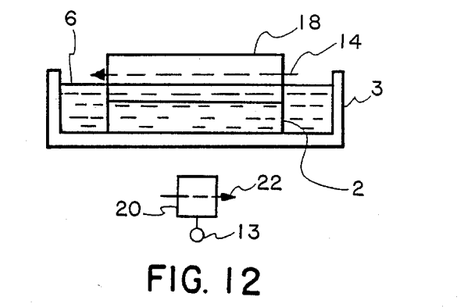

The FIG. 11 and 12 embodiments utilize a horizontally directed magnetic field 14 provided by a field magnet 16 and 18 placed above superconductor 2. Suspended magnet 20 is positioned below the superconductor to provide a magnetic moment 22 that is parallel to and in the same direction as magnetic field 14 at the location of suspended magnet 20.

Figure 13:
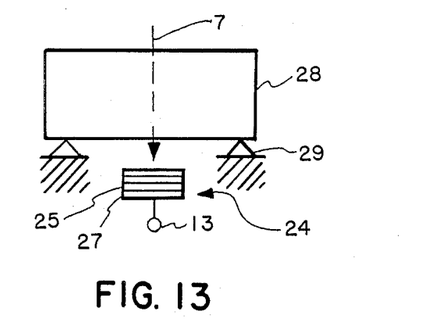
Figure 14:
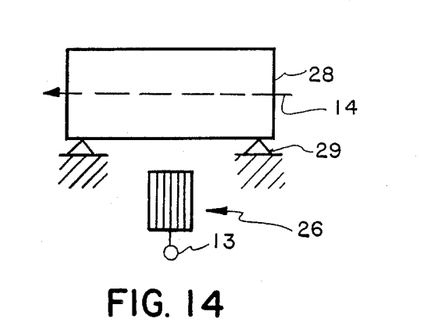

FIGS. 13 and 14 show embodiments in which the suspended objects 24 and 26 are made from a composite material. The composite material comprises a superconducting phase 25 and a phase 27 which is attracted to overhead field magnet 28. Attractive phase 27 can be a ferromagnetic material, a paramagnetic material, a magnet, or a combination of these attractive materials. These phases can be combined as laminates, discrete particles, or in other arrangements to make up the suspended objects 24 and 26. As shown in FIG. 13, the field magnet can be supported by supports 29 to provide a vertical field 7 (oriented either up or down), or as shown in FIG. 14 to provide a horizontal field 14 (oriented either left or right).

The suspension devices illustrated above can be used to help provide stability to a transport system. These devices can be used to maintain a body of fixed distance from another body or surface, particularly in a transport system.

The preferred embodiments of this invention have been illustrated and described above. Modifications and additional embodiments, however, will undoubtedly be apparent to those skilled in the art. Furthermore, equivalent elements, such as permanent or electro magnets, may be substituted for those illustrated and described herein; parts or connections might be reversed or otherwise interchanged; and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

REFERENCES

1. V. Arkadiev, Nature 160, 330 (1947).
2. R. Williams and J. R. Matey, Appl. Phys. Lett. 52, 751 (1988).
3. F. Hellman, E. M. Gyorgy, D. W. Johnson, Jr., H. M. O'Bryan and R. C. Sherwood, J. Appl. Phys. 63, 447 (1988).
4. F. C. Moon, M. M. Yanoviak and R. Ware, Appl. Phys. Lett. 52, 1534 (1988).
5. R. J. Cava, B. Batlogg, R. B. van Dover, D. W. Murphy, S. Sunshine, T. Siegrist and J. P. Remeika, Phys. Rev. Lett. 58, 1676 (1987).
6. P. N. Peters, R. C. Sisk, E. W. Urban, C. Y. Huang and M. K. Wu, Appl. Phys. Lett. 52, 2066 (1988).

We claim:

1. A device for suspending a load comprising:
   a support;
   a superconductor supported by the support;
   a magnetic field penetrating the superconductor;
   a magnet suspended below the superconductor, the magnet providing a magnetic moment which is substantially aligned parallel to and in the same direction as the magnetic field; and
   a means for coupling the load to the magnet.

2. The device as claimed in claim 1 wherein the magnetic field is substantially vertical, and the magnetic moment is aligned parallel to and in the same direction as the magnetic field.

3. The device as claimed in claim 1 wherein the magnetic field is predominately horizontal, and the magnet is oriented to provide the magnetic moment parallel to and in the same direction as the magnetic field.

4. The device as claimed in claim 1 including a field magnet positioned above the superconductor, the field magnet being oriented to provide the magnetic field.

5. The device as claimed in claim 4 wherein the field magnet is levitated above the superconductor.

6. The device as claimed in claim 4 wherein the field magnet is supported on the upper surface of the superconductor.

7. A device for suspending a load comprising: a support;
   a superconductor supported by the support;
   a first magnet levitated above the superconductor, the magnet providing a magnetic field which is substantially vertical;
   a second magnet suspended below the superconductor and oriented to provide a magnetic moment aligned parallel to and in the same direction as the magnetic field; and
   a means for coupling the load to the second magnet.

8. The device as claimed in claim 7 wherein the first magnet is supported by the superconductor.

9. A device for suspending a load comprising:
   a support;
   a superconductor supported by the support;
   a first magnet levitated above the superconductor and oriented to provide a magnetic field which is substantially horizontal;
   a second magnet suspended below the superconductor and oriented to provide a magnetic moment aligned parallel to and in the same direction as the magnetic field;
   means for coupling the load to the second magnet.

10. The device as claimed in claim 9 wherein the first magnet is supported by the superconductor.

11. A device for suspending a load comprising:
    a support;
    a magnet coupled to the support and providing a magnetic field;

a composite material suspended below the magnet, the composite material comprising a superconductor and an attractive material selected from the group consisting of a ferromagnetic material, a paramagnetic material, and a magnet; and a means for coupling the load to the composite material.

12. The device as claimed in claim 11 wherein the magnetic field is a substantially vertical magnetic field.

13. The device as claimed in claim 11 wherein the magnetic field is a substantially horizontal magnetic field.

* * * * *